UNITED STATES PATENT OFFICE.

FRANCIS ROUBILIAC CONDER, OF GUILFORD, ENGLAND.

PROCESS OF PURIFYING SEWAGE.

SPECIFICATION forming part of Letters Patent No. 475,670, dated May 24, 1892.

Application filed May 21, 1889. Serial No. 311,623. (No specimens.)

*To all whom it may concern:*

Be it known that I, FRANCIS ROUBILIAC CONDER, a subject of the Queen of Great Britain, residing at Guilford, in the county of Surrey, England, have invented a new and useful Improved Process for the Arrest or Prevention of Putrefaction of Organic Matter, of which the following is a specification.

The basis of the chemical purification of organic matter as hitherto practiced is that all matter held in solution shall be converted into insoluble compounds and then precipitated. One result of this system is that as the deposit is brought down other substances, chiefly inorganic and not directly concerned in the reaction, are also precipitated, and a serious defect is that such precipitation merely effects the displacement of putrescible matter, but does not arrest or prevent the putrefaction thereof, while the precipitate formed thereby generally contains from eighty-five to ninety-five per cent. of water, which it is both costly and offensive to evaporate.

It is already known that the salts of certain metals—such as bichromate of potash, for instance—form insoluble compounds with organic matter in the presence of light, but not in its absence, and this peculiar property forms the basis of one method of photography. Now I have discovered that salts of iron possess a similar property, and that in consequence thereof their action on putrescible organic matter is far more energetic and perfect in darkness than in the presence of light.

One feature of my improved process consists, therefore, in applying to the liquid or substance wherein it is desired to arrest or prevent the process of putrefaction an ascertained and suitable quantity of metallic salt in solution in the absence of light. As regards the particular kind of metallic salt to be employed, I prefer to use sulphate of iron, either anhydrous or crystalline. The proportion so to be applied I find to be equal to about one part of anhydrous sulphate of iron to ten parts of putrescible organic matter; but this proportion may be varied within certain limits without materially interfering with the result, although I have found in practice that the nearer the proportion employed approximates to that above indicated the better.

It is also well known that hitherto solutions of sulphate of iron have been unmanageable, owing to the fact that the iron which they contain rapidly oxidizes and precipitates, so that the strength of the solution is not maintained. To counteract this tendency, a small quantity of sulphuric or other inorganic acid is sometimes added to the solution; but the acidity imparted to the liquid by so doing is often attended with very mischievous consequences. Now I have discovered that the addition of a small portion of organic matter—such as raw meat or the skins of oranges or lemons—to a solution of sulphate of iron will prevent oxidation without being accompanied with any unfavorable result.

A second feature in my improved process consists, therefore, in so employing organic matter, and I have found in practice that half of the skin of a lemon or orange will maintain the soluble condition of four or five pounds of sulphate of iron in solution when it is added to the liquid or substance wherein it is desired to arrest or prevent putrefaction.

When my improved process is to be used for the prevention of the putrefaction of sewage, the minimum quantity of water required is about half a gallon in twelve hours for every individual contributing to the sewage, and the quantity of crystalline sulphate of iron required is about half an ounce per individual for twenty-four hours. In places that are not densely populated it will be found unnecessary to keep the process in action during the night, in which case the proportion of metallic salt employed should be dissolved in the period during which the flow is maintained. The flow of sewage by night is usually less than one-half of the flow by day and is also much weaker. Where, however, a considerable number of persons are concerned, it is desirable to divide the twenty-four hours into three periods—viz., from six a. m. to eleven a. m., from eleven a. m. to five p. m., and from five p. m. to six a. m.—dissolving equal quantities—say one-sixth of an ounce per individual—in each of such periods.

By my improved process for treating putrescible matter, as hereinbefore described, it will be found that putrefaction may be readily arrested or prevented at the same time that such process dispels all the noxious odors arising from decaying matter, sewage, and other foul waters either in the house or in the sewers or cess-pits or in the earth into which such sewage may have soaked or in the water-courses into which it may be carried.

When my invention is used to prevent putrefaction in running sewage, a constant flow of the solution should be maintained; but when applied to cess-pits and other similar receptacles an intermittent supply will suffice, such intermittent supply being regulated according to the quantity of putrescible organic matter wherein it is desired to arrest putrefaction. In all cases, however, it is an essential feature of my process that the metallic salt employed should be used in proportions suitable to the quantity of organic matter to be resolved—that is to say, in the proportion of about one part of anhydrous sulphate of iron to two parts of ammonia in the organic matter under treatment.

I do not claim the mere use of a dilute solution of a ferrous salt as a disinfectant.

What I claim is—

The method of arresting putrefaction in sewage, which consists in first treating a solution of a ferrous salt, such as the sulphate of iron, with a small quantity of putrescible organic matter, such as raw meat or fruit skin, whereby the usual rapid oxidation of the salt when mixed with an excess of water is retarded, and then mixing the prepared solution with the sewage in the absence of light, substantially as and in the proportions hereinbefore set forth.

FRANCIS ROUBILIAC CONDER.

Witnesses:
SHIRLEY BOWDEN,
*Patent Agent, 33 Southampton Buildings, Holborn, London, England.*
F. BOWDEN,
*London.*